United States Patent
Wikstrom

(10) Patent No.: US 6,702,346 B2
(45) Date of Patent: Mar. 9, 2004

(54) BUMPER BEAM ARRANGEMENT

(75) Inventor: Lars Wikstrom, Lulea (SE)

(73) Assignee: SSAB Hardtech, AB, Lulea (SE)

( * ) Notice: Subject to any disclaimer, the term of this patent is extended or adjusted under 35 U.S.C. 154(b) by 0 days.

(21) Appl. No.: 10/363,596

(22) PCT Filed: Sep. 5, 2001

(86) PCT No.: PCT/SE01/01887
§ 371 (c)(1),
(2), (4) Date: Mar. 4, 2003

(87) PCT Pub. No.: WO02/24488
PCT Pub. Date: Mar. 28, 2002

(65) Prior Publication Data
US 2003/0178861 A1 Sep. 25, 2003

(30) Foreign Application Priority Data
Sep. 20, 2000 (SE) .............................. 00034199

(51) Int. Cl.$^7$ .......................... B60R 19/26; B60R 19/34
(52) U.S. Cl. ........................................ 293/133; 293/132
(58) Field of Search ................................ 293/132, 133, 293/102, 154, 155; 296/187.01, 187.03, 187.09

(56) References Cited

U.S. PATENT DOCUMENTS

| 3,897,095 | A | * | 7/1975 | Glance et al. ............... 293/120 |
| 3,998,485 | A | * | 12/1976 | Putter et al. ................. 293/133 |
| 4,422,680 | A | * | 12/1983 | Goupy ........................ 293/122 |
| 5,174,421 | A | * | 12/1992 | Rink et al. ................... 188/374 |
| 5,314,229 | A | * | 5/1994 | Matuzawa et al. ..... 296/187.09 |
| 6,474,708 | B1 | * | 11/2002 | Gehringhoff et al. ....... 293/120 |
| 6,474,709 | B2 | * | 11/2002 | Artner ......................... 293/133 |
| 6,485,072 | B1 | * | 11/2002 | Werner et al. .............. 293/132 |
| 6,520,552 | B2 | * | 2/2003 | Schroter et al. ............ 293/132 |
| 6,547,295 | B2 | * | 4/2003 | Vismara ...................... 293/133 |
| 6,554,333 | B2 | * | 4/2003 | Shimotsu et al. ........... 293/132 |
| 2002/0113447 | A1 | * | 8/2002 | Frank .......................... 293/133 |
| 2002/0163211 | A1 | * | 11/2002 | Hagen ........................ 293/132 |

FOREIGN PATENT DOCUMENTS

| DE | 4127381 | * | 9/1992 | |
| DE | 4238631 | * | 5/1994 | ................ 293/132 |
| DE | 19537186 | * | 4/1996 | |
| DE | 19958887 | | 6/2000 | |
| DE | 10000747 | | 8/2000 | |
| DE | 19904879 | | 8/2000 | |
| EP | 763448 | * | 3/1997 | |
| WO | 8001829 | * | 9/1980 | ................ 293/132 |

* cited by examiner

*Primary Examiner*—D. Glenn Dayoan
*Assistant Examiner*—H. Gutman
(74) *Attorney, Agent, or Firm*—Mark P. Stone

(57) ABSTRACT

The bumper beam 11 of a vehicle has a hat profile and it is mounted in two tapered crash boxes 12, 13, which extend into the hat profile with their narrow ends. These narrow ends are fixed to the bottom of the hat profile so that the crash boxes will flatten out the hat profile when they are axially compressed. This arrangement is particularly advantageous for reducing the damages in low-velocity offset crashes that have an effect on only one of the crash boxes since it reduces the risk of damages on other parts than the crash box and the bumper beam.

2 Claims, 2 Drawing Sheets

BUMPER BEAM ARRANGEMENT

TECHNICAL FIELD

This invention relates to a bumper beam arrangement for a vehicle, comprising a bumper beam that has an open profile with a top end and two sides, wherein the beam is mounted on two crash boxes, which protrude into the profile and are mounted to the top end of the profile.

DESCRIPTION OF PRIOR ART

To mount bumper beams in crash boxes is known for example from EP-0763448 A1, DE-19537186 A1, DE-4127381 A1, and U.S. Pat. No. 3,998,485 A1. The crash boxes take up energy in a crash by being plastically deformed axially. The strength of the crash boxes can be designed for high-speed crashes, but crash boxes can alternatively be designed for low speed crashes.

U.S. Pat. No. 3,998,485 A1 shows crash boxes for low speed crashes in the form of tubes with a constant cross section, in which a bumper beam with a U-formed cross section is mounted. When a crash box is axially compressed, the two sides of the bumper beam will be forced into the body of the vehicle and cause damages also in a crash at very low speed. In a light offset crash on one of the crash boxes, this crash box will be axially compressed while the bumper beam will practically not be deformed. Yet, the bumper beam will damage the vehicle body. Conical crash boxes are shown at the rear of the tube formed crash boxes and these conical crash boxes are adapted not to be deformed until the tube formed crash boxes have been compressed.

Bumper beams having hat profile are shown for example in WO-94/0770.

OBJECT OF INVENTION

It is an object of the invention to reduce the risk of damage on the body in low velocity crashes and in particular in such offset crashes. To this end, the crash boxes taper off and protrudes into the profile with their narrow ends so that the crash boxes force the sides of the profile to widen the profile and make it flatter when the crash boxes are axially compressed. The invention is defined by the claims.

DESCRIPTION OF THE PREFERRED EMBODIMENT

Figure 1:
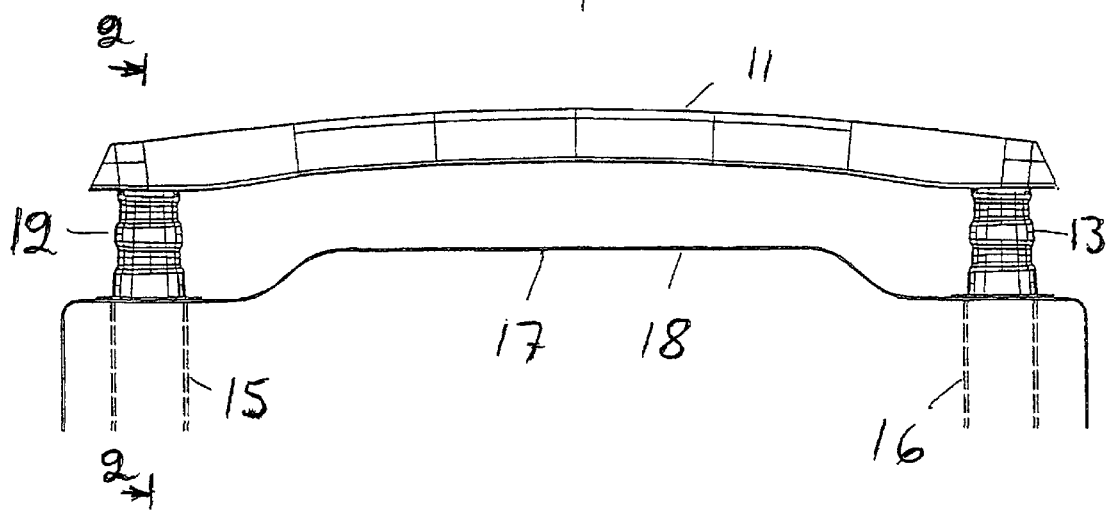
FIG. 1 is a top view of a bumper beam of a passenger vehicle, mounted to the vehicle in accordance with the invention.

FIG. 1 shows one end of a vehicle, for example a passenger car, which has a bumper beam 11 mounted in two crash boxes 12,13, which are mounted in a structural part of the vehicle body. In the figures, the crash boxes are shown mounted on the ends of the side rails (side beams) 15,16 of the vehicle body. In the figure, a panel 17 is shown, which may be a front panel or a rear panel of the vehicle and such a panel has often an enlargement 18 in the middle so as to give place for a radiator or a spare wheel. The bumper beam is usually curved as shown in order to give place for such an enlargement 18. A non-illustrated shell of plastics usually hides the bumper beam.

Figure 2:
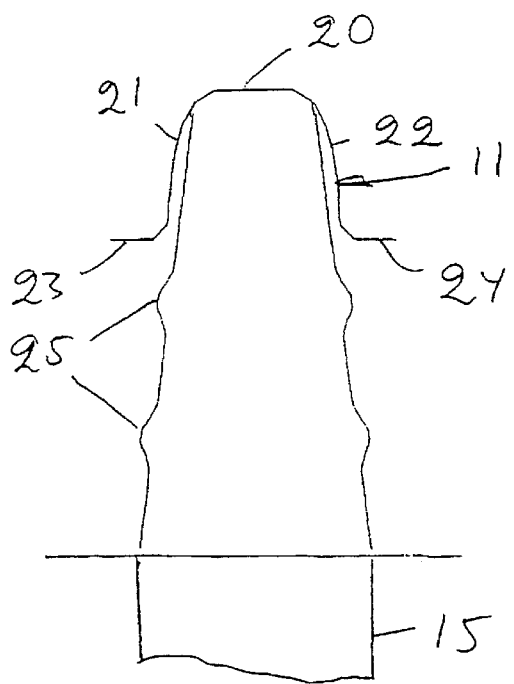
FIG. 2 is a section taken along the line 2—2 in FIG. 1 and it shows one of two crash boxes shown in FIG. 1.
Figure 3:
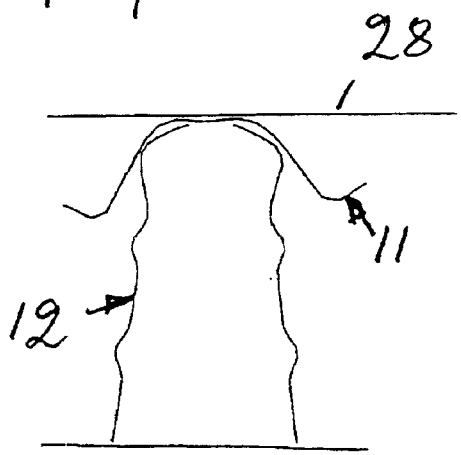
FIGS. 3–6 correspond to FIG. 2, but they are shown in various stages of compression of the crash box shown in FIG. 2 when the bumper beam hits a barrier.
Figure 4:
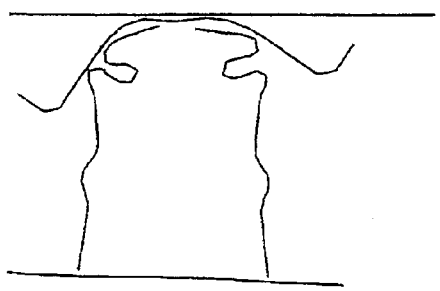
Figure 5:
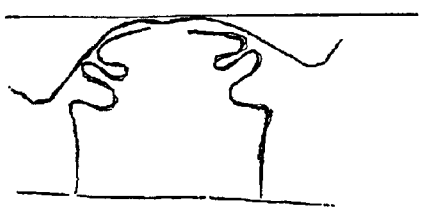
Figure 6:
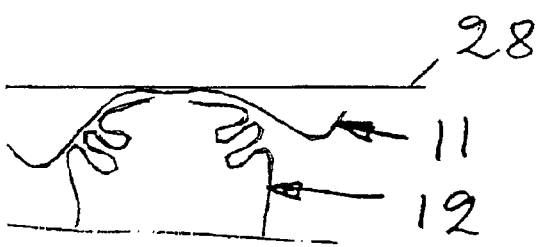

FIG. 2 is a section through the crash box 12 and the bumper beam 11 and it is taken along line 2—2 in FIG. 1. The bumper beam 11 has an open profile shown as a hat profile with a crown comprising a top or central flange 20 and two sides or webs 21,22 that end in two side flanges (brims) 23,24. The bumper beam 11 is mounted with its top end 20 in one end of the crash box 12 so that the crash box extends into the bumper beam and fills out a major part of the cross section of the bumper beam. The crash box 12 may have a round, rectangular or square cross section and it widens towards its mounting to the vehicle as shown so that it is wider at its base than the distance between the two sides of the bumper beam. It has deformation guides 25.

The FIGS. 3–6 show in a sequence the compression of the crash box 12 when the bumper beam hits a barrier 28. The crash box folds and the folds forces the sides 21,22 of the bumper beam outwards so that the bumper beam flattens out. Therefore, the sides of the bumper beam will not hit the panel 17. In low velocity crashes and in particular in low velocity off-set crashes on only one of the crash boxes, the crash box and the bumper beam will be the only parts that are damaged. The other parts of the vehicle, that is, the panel 17 in FIG. 1, will not be damaged.

What is claimed is:

1. A bumper beam arrangement for a vehicle, comprising a bumper beam (11) that has an open profile with a top end (20) and two sides (21,22), wherein the beam is mounted on two crash boxes (12,13), which are mounted to the vehicle body and protrude into the profile and are fastened to the top end (20) of the profile, characterised in that the crash boxes (12,13) taper off and protrude into the profile with their narrow ends so that the crash boxes force the sides of the profile (21,22) to widen the profile and make it flatter when the crash boxes are axially compressed.

2. A bumper beam arrangement according to claim 1, characterised in that the beam (11) has a hat profile.

* * * * *